(12) United States Patent
Baer

(10) Patent No.: US 10,780,533 B2
(45) Date of Patent: Sep. 22, 2020

(54) COMPONENT HAVING WEAR-PROTECTED OPENINGS AND RECESSES AND PROCESS FOR THE PRODUCTION THEREOF

(71) Applicant: MTU Aero Engines AG, Munich (DE)

(72) Inventor: Sebastian Baer, Munich (DE)

(73) Assignee: MTU AERO ENGINES AG, Munich (DE)

( * ) Notice: Subject to any disclaimer, the term of this patent is extended or adjusted under 35 U.S.C. 154(b) by 463 days.

(21) Appl. No.: 15/452,838

(22) Filed: Mar. 8, 2017

(65) Prior Publication Data
US 2017/0259385 A1 Sep. 14, 2017

(30) Foreign Application Priority Data

Mar. 9, 2016 (EP) ..................................... 16159291

(51) Int. Cl.
*B23K 1/00* (2006.01)
*B23P 6/04* (2006.01)
(Continued)

(52) U.S. Cl.
CPC ............ *B23P 6/045* (2013.01); *B23K 1/0018* (2013.01); *B23K 35/02* (2013.01);
(Continued)

(58) Field of Classification Search
CPC ........ B23P 6/045; B23P 6/005; B23K 35/304; B23K 35/3046; B23K 35/0238; B23K 35/02; B23K 35/3033; B23K 1/0018; B23K 35/0244; B23K 2103/166; B23K 2101/001; B23K 2103/08; B23K 2101/008; B32B 15/01; C22C 19/058; C22C 19/07;
(Continued)

(56) References Cited

U.S. PATENT DOCUMENTS 4,705,203 A * 11/1987 McComas ............... B23P 6/007
228/119
5,071,054 A * 12/1991 Dzugan ................ B23K 20/021
228/119
(Continued)

FOREIGN PATENT DOCUMENTS

EP 0673292 B1 9/1995
EP 1219375 A2 7/2002
(Continued)

*Primary Examiner* — Kiley S Stoner
(74) *Attorney, Agent, or Firm* — Abel Schillinger, LLP

(57) ABSTRACT

The present invention relates to a method for producing and/or repairing wear-stressed recesses or openings on components (22) of a turbomachine, especially of elements of a flow passage boundary, and also to corresponding components, wherein the method comprises:
producing an at least two-layer molded repair part (15), one layer (2) of which is formed by an Ni-solder and a further layer (3) of which is formed from a mixture of an Ni-solder (4) and hard material particles (5) of hard alloys on a base of cobalt or nickel and which at least partially has an outer shape which is complementary to the inner shape of the recess (20) or opening which is to be repaired,
inserting the molded repair part (15) into the recess (20) or opening and
at least partially heat-treating the component (22) for soldering the molded repair part (15) onto the component.

12 Claims, 2 Drawing Sheets

(51) Int. Cl.
| | |
|---|---|
| *B23K 35/02* | (2006.01) |
| *B23K 35/30* | (2006.01) |
| *B23P 6/00* | (2006.01) |
| *B32B 15/01* | (2006.01) |
| *C22C 19/05* | (2006.01) |
| *C22C 19/07* | (2006.01) |
| *C22F 1/10* | (2006.01) |
| *B23K 101/00* | (2006.01) |
| *B23K 103/08* | (2006.01) |
| *B23K 103/16* | (2006.01) |
| *F01D 5/28* | (2006.01) |
| *F01D 25/24* | (2006.01) |

(52) U.S. Cl.
CPC ...... *B23K 35/0238* (2013.01); *B23K 35/0244* (2013.01); *B23K 35/304* (2013.01); *B23K 35/3033* (2013.01); *B23K 35/3046* (2013.01); *B23P 6/005* (2013.01); *B32B 15/01* (2013.01); *C22C 19/058* (2013.01); *C22C 19/07* (2013.01); *C22F 1/10* (2013.01); *B23K 2101/001* (2018.08); *B23K 2103/08* (2018.08); *B23K 2103/166* (2018.08); *F01D 5/286* (2013.01); *F01D 25/24* (2013.01); *F05D 2230/40* (2013.01); *F05D 2230/80* (2013.01); *F05D 2300/177* (2013.01)

(58) Field of Classification Search
CPC . C22F 1/10; F01D 5/286; F01D 25/24; F05D 2230/40; F05D 2300/177; F05D 2230/80
USPC ............. 228/119, 245–262; 29/889–889.722
See application file for complete search history.

(56) References Cited

U.S. PATENT DOCUMENTS

| | | | | |
|---|---|---|---|---|
| 5,156,321 | A * | 10/1992 | Liburdi | B22F 7/062 228/119 |
| 5,523,169 | A | 6/1996 | Rafferty et al. | |
| 5,666,643 | A * | 9/1997 | Chesnes | B23K 35/0222 428/549 |
| 5,873,703 | A * | 2/1999 | Kelly | B23K 1/0018 228/119 |
| 5,890,274 | A * | 4/1999 | Clement | B23K 35/0222 29/527.2 |
| 6,109,505 | A * | 8/2000 | Malie | B23K 35/0244 228/119 |
| 6,199,746 | B1 * | 3/2001 | Dupree | B23P 6/005 228/119 |
| 6,530,971 | B1 * | 3/2003 | Cohen | B23K 35/0244 148/24 |
| 6,624,225 | B1 * | 9/2003 | Ellison | B22F 1/0059 524/434 |
| 6,672,501 | B2 | 1/2004 | Fried | |
| 7,222,422 | B2 * | 5/2007 | Gupta | B23K 1/0008 29/889.1 |
| 7,343,676 | B2 | 3/2008 | Ng | |
| 7,360,678 | B2 | 4/2008 | Pietruska et al. | |
| 7,789,288 | B1 * | 9/2010 | Johnson | B23K 1/0018 228/119 |
| 8,141,769 | B2 * | 3/2012 | Ott | B23K 1/0018 228/119 |
| 8,235,275 | B1 * | 8/2012 | Stankowski | B23K 1/0018 228/56.3 |
| 8,342,386 | B2 | 1/2013 | Cretegny et al. | |
| 8,394,215 | B2 * | 3/2013 | Abriles | B23K 9/04 148/559 |
| 8,496,990 | B2 * | 7/2013 | Tuppen | B23P 6/002 427/142 |
| 8,544,716 | B2 | 10/2013 | Daniels et al. | |
| 8,595,929 | B2 * | 12/2013 | Manjooran | B23P 6/007 29/889.1 |
| 8,703,044 | B2 | 4/2014 | Sathian et al. | |
| 9,035,213 | B2 * | 5/2015 | Arjakine | B05B 7/228 219/121.64 |
| 9,056,443 | B2 | 6/2015 | Schick et al. | |
| 10,265,806 | B2 * | 4/2019 | Cui | B23K 1/00 |
| 2001/0025417 | A1 * | 10/2001 | Fried | B23K 1/19 29/889.1 |
| 2002/0020734 | A1 * | 2/2002 | Meier | B23K 1/0018 228/119 |
| 2002/0100793 | A1 | 8/2002 | Fried | |
| 2002/0119338 | A1 | 8/2002 | Hasz et al. | |
| 2002/0164417 | A1 * | 11/2002 | Khan | C04B 41/009 427/140 |
| 2003/0034379 | A1 * | 2/2003 | Jackson | B23P 6/005 228/119 |
| 2003/0183529 | A1 * | 10/2003 | Ohara | C23C 6/00 205/109 |
| 2004/0050913 | A1 * | 3/2004 | Philip | B23K 20/023 228/194 |
| 2004/0124231 | A1 * | 7/2004 | Hasz | B23K 35/3046 228/245 |
| 2004/0214938 | A1 * | 10/2004 | Ruud | C04B 35/481 524/431 |
| 2005/0035086 | A1 * | 2/2005 | Chen | C23C 4/00 216/83 |
| 2005/0067466 | A1 * | 3/2005 | Boegli | B23K 9/04 228/119 |
| 2005/0121784 | A1 * | 6/2005 | Standing | B23K 35/0244 257/737 |
| 2005/0181231 | A1 * | 8/2005 | Gupta | B23K 1/0008 428/668 |
| 2006/0163323 | A1 * | 7/2006 | Pietruska | B23P 6/007 228/101 |
| 2006/0263624 | A1 * | 11/2006 | Jabado | B23K 1/0018 428/615 |
| 2007/0050976 | A1 * | 3/2007 | Jungbluth | B22F 7/062 29/889.1 |
| 2007/0154338 | A1 * | 7/2007 | Sathian | B23K 1/0018 419/5 |
| 2007/0295785 | A1 * | 12/2007 | Budinger | B23K 3/06 228/119 |
| 2008/0017694 | A1 * | 1/2008 | Schnell | B23K 35/304 228/119 |
| 2008/0142575 | A1 * | 6/2008 | Cretegny | B23K 35/0244 228/256 |
| 2008/0187777 | A1 | 8/2008 | Sathian | |
| 2009/0041611 | A1 * | 2/2009 | Sathian | B23K 35/3046 419/29 |
| 2009/0280023 | A1 * | 11/2009 | Hu | B23K 1/0018 420/445 |
| 2010/0008816 | A1 * | 1/2010 | Hu | B23K 26/0096 420/445 |
| 2010/0059573 | A1 * | 3/2010 | Kottilingam | B23K 1/001 228/164 |
| 2010/0062151 | A1 * | 3/2010 | Tuppen | B23P 6/002 427/140 |
| 2010/0187290 | A1 * | 7/2010 | Holi | B23K 1/0008 228/119 |
| 2010/0215984 | A1 * | 8/2010 | Oiwa | B23K 35/0244 428/680 |
| 2010/0237134 | A1 * | 9/2010 | Bucci | B22F 7/062 228/119 |
| 2010/0270062 | A1 * | 10/2010 | Casper | B23K 1/0016 174/257 |
| 2011/0068149 | A1 * | 3/2011 | Hirano | B22F 1/025 228/56.3 |
| 2011/0088260 | A1 * | 4/2011 | Yoshioka | B22F 7/062 29/888 |
| 2012/0111928 | A1 * | 5/2012 | Park | B23K 1/0018 228/245 |
| 2012/0125523 | A1 * | 5/2012 | Dupre | B23P 6/005 156/98 |
| 2012/0125979 | A1 * | 5/2012 | Daniels | B23K 35/0244 228/119 |
| 2012/0125980 | A1 * | 5/2012 | Richter | F01D 5/005 228/159 |

(56) References Cited

U.S. PATENT DOCUMENTS

| | | | |
|---|---|---|---|
| 2013/0001278 A1* | 1/2013 | Cretegny | B23K 1/0018 228/176 |
| 2013/0020377 A1* | 1/2013 | Stankowski | B23K 1/0018 148/24 |
| 2013/0156555 A1* | 6/2013 | Budinger | B23K 1/0018 415/182.1 |
| 2014/0044939 A1* | 2/2014 | Hunt | F01D 5/005 428/210 |
| 2014/0220376 A1* | 8/2014 | Schick | B32B 15/01 428/615 |
| 2014/0342169 A1* | 11/2014 | Daniels | F01D 5/22 428/457 |
| 2015/0050511 A1* | 2/2015 | Werner | F01D 5/288 428/558 |
| 2015/0111060 A1* | 4/2015 | Kottilingam | B23K 35/0222 428/608 |
| 2015/0174707 A1* | 6/2015 | Li | B23P 6/045 427/142 |
| 2015/0181685 A1* | 6/2015 | Sekhar | H01J 37/3233 219/121.46 |
| 2015/0328725 A1* | 11/2015 | Wieland | B23K 35/0222 428/600 |
| 2015/0343573 A1* | 12/2015 | Albert | B23P 6/002 29/898.08 |
| 2015/0367456 A1* | 12/2015 | Ozbaysal | C22C 19/007 419/8 |
| 2015/0375322 A1* | 12/2015 | Salm | B23K 1/0018 428/548 |
| 2015/0377037 A1 | 12/2015 | Salm et al. | |
| 2016/0002760 A1* | 1/2016 | Hiraide | C22C 38/28 403/272 |
| 2016/0339544 A1* | 11/2016 | Xu | B23K 35/3033 |
| 2016/0368024 A1* | 12/2016 | Linke | B23K 20/227 |
| 2017/0100805 A1* | 4/2017 | Daniels | C25D 3/12 |
| 2017/0266749 A1* | 9/2017 | Whims | B23K 9/0026 |
| 2017/0312867 A1* | 11/2017 | Kuhlee | B23P 6/005 |

FOREIGN PATENT DOCUMENTS

| | | | |
|---|---|---|---|
| EP | 1516942 A1 * | 3/2005 | |
| EP | 1685923 B1 | 8/2006 | |
| EP | 1803521 A1 | 7/2007 | |
| EP | 2762257 A1 | 8/2014 | |
| EP | 2774710 A1 | 9/2014 | |
| JP | 2005305492 A | 11/2005 | |
| WO | 9411139 A1 | 5/1994 | |
| WO | 2011015192 A1 | 2/2011 | |
| WO | WO-2013075688 A1 * | 5/2013 | |
| WO | WO-2015065606 A1 * | 5/2015 | F01D 5/005 |

* cited by examiner

COMPONENT HAVING WEAR-PROTECTED OPENINGS AND RECESSES AND PROCESS FOR THE PRODUCTION THEREOF

BACKGROUND OF THE INVENTION

Field of the Invention

The present invention relates to a component of a turbomachine having wear-protected openings, boreholes or recesses, and also to a process for the production thereof.

DISCUSSION OF BACKGROUND INFORMATION

In turbomachines and also stationary gas turbines or aviation engines, operating conditions prevail in part in the region of the flow passage during which aggressive media at very high temperatures are moved at high flow velocities so that the components are also exposed inter alia to severe vibrations. Accordingly, components in the region of the flow passage have to meet multifarious requirements under said circumstances and in particular need to have a high wear resistance to fretting. This is especially necessary in the region of openings, boreholes and recesses where a particularly high level of wear can become noticeable on account of the flow conditions.

Accordingly, it is necessary to especially protect such regions or to recondition such regions after a specified operating period.

For the protection of components in turbomachines, such as blade airfoils, it is already known to apply soldering materials, as is described for example in EP 1 685 923 A1, U.S. Pat. No. 8,342,386 B2, EP 1 219 375 A2, U.S. Pat. No. 7,343,676 B2, WO 2011/015192 A1, EP 0 673 292 B1, EP 2 774 710 A1 or JP-2005 305 492 A. However, for producing wear-protected openings or recesses or for repairing such molded components with wear-resistant materials, special requirements exist since the surfaces to be machined, such as the surfaces of turbine blades and the like, are not so easily accessible.

It is therefore the object of the present invention to provide a method for producing and/or repairing wear-protected openings, boreholes, recesses and the like of components of a turbomachine and especially of components of a flow passage boundary, and also to provide corresponding components which meet both the high demands for wear protection itself and for the resistance and adhesion of the applied wear protection and also to meet the requirements with regard to a simple and effective application.

SUMMARY OF THE INVENTION

For producing or repairing wear-stressed boreholes or openings on components of a turbomachine, especially of elements of a flow passage boundary, the invention proposes to create an at least two-layer, three-dimensional molded repair part which can be inserted into the borehole or opening and by means of a heat treatment can be bonded to a wall which encompasses the borehole or opening. The invention can correspondingly be used in the case of openings, boreholes or recesses which by an encompassing wall delimit and enclose a space, wherein a normal to the wall has a vector component which is oriented transversely to a central axis of the opening or recess or to an oppositely-disposed wall region.

According to the invention, the at least two-layer molded repair part can have one layer of an Ni-solder, wherein a second layer is formed from a mixture of an Ni-solder and hard material particles, wherein the hard material particles are formed from hard alloys on a base of cobalt and/or nickel, especially CoCrMo alloys, such as T800. The molded repair part can be designed so that an outer shape of the molded repair part at least partially corresponds to the inner shape of the borehole or opening to be repaired, that is to say the surface of the molded repair part corresponds at least partially to the shape of the wall which encompasses the opening or recess so that when the molded repair part is inserted into the recess or opening a flat abutment of the molded repair part against the wall boundary of the opening or recess comes about so that as a result of a corresponding heat treatment a good soldered bond is achieved between the molded repair part and the wall boundary of the opening or recess.

As a result of the at least two-layered design of the molded repair part with an outer Ni-solder layer, which when inserted into the recess or opening comes into contact with the wall which delimits the opening or recess, a good connection of the molded repair part to the wall of the opening or recess can be achieved. The at least second layer consisting of a mixture of Ni-solder and hard material particles (mixture layer), which after insertion of the molded repair part into the opening or recess constitutes the outer boundary of the opening or recess and therefore comes into contact with the media conducted in the flow system and/or with surfaces of adjacent components, a good wear protection can be provided. This is especially necessary since the mixture layer can have a high proportion of hard material particles in the form of hard alloys since as a result of the pure Ni-solder layer, which serves for connecting to the base material of the component to be protected, a particularly good abutment and adhesion and also bond with the component is made possible and therefore the mixture layer does not have to be matched to this requirement.

The molded repair part can be produced so that first of all a two-layer soldering tape or a soldering plate with an Ni-solder layer and a mixture layer of a mixture of Ni-solder and hard material particles is created, and then the corresponding two-layer soldering tape, by deep drawing or pressing into a die, is brought into the corresponding shape of a molded repair part.

The borehole, recess or opening, which is to be protected against wear by the application of the molded repair part, can be prepared by material machining and especially material removal for insertion of the molded repair part, wherein in this way not only the shape of the opening or recess can be matched to the outer shape of the molded repair part but also undesirable oxide layers or other foreign substances can be removed in order to ensure adhesion of the molded repair part to the base material of the component to be protected. The component to be protected can especially be formed by a nickel-based, or cobalt-based alloy, in which nickel or cobalt therefore form the primary alloy constituent. It can especially be superalloys with these primary alloy constituents which reach operating temperatures of over 55%, especially 80% or 90%, of their melting temperature and for example can be of monocrystalline design.

The mixture layer of the molded repair part can be constructed with a mixture of Ni-solder and hard material particles so that the layer has 20 to 60 wt. %, preferably 30 to 50 wt. %, extremely preferably 35 to 45 wt. %, especially 40 wt. % of hard particles.

The layer of Ni-solder preferably does not have hard material particles in order to ensure the best possible connection to the base material of the component to be protected.

The Ni-solder can be an alloy which has chromium, silicon and/or boron and also nickel, as the primary constituent, and unavoidable impurities.

In the case of the hard alloy for the hard material particles, it can be a Co—Mo—Cr—Si-alloy which especially comprises 16.5 to 18.5 wt. % chromium, 27 to 30 wt. % molybdenum, 3 to 3.8 wt. % silicon, up to 3 wt. % nickel and iron, up to 0.1 wt. % sulfur, nitrogen, oxygen and hydrocarbon in each case, and can have cobalt and unavoidable impurities as the remainder.

The heat treatment for bonding the molded repair part to the component to be protected can be carried out so that the whole component with the inserted molded repair part, or only one region of the component in which the molded repair part is inserted, is exposed to the heat treatment. The heat treatment can be carried out under vacuum conditions or under protective gas in order to avoid reactions of the component with the ambient atmosphere occurring during the heat treatment.

A drying process can be connected upstream of the heat treatment in which the applied solder with the hard material particles is air-dried at 50° to 80° Celsius, preferably at 60° to 70° Celsius, in order to expel for example binding agents which the soldering tape or the molded repair part can contain.

The heat treatment for carrying out the soldering process can be conducted within the temperature range of 1150° C. to 1200° C., especially 1170° C. to 1180° C., for 10 to 25 minutes, especially for 15 to 20 minutes.

The heating up process for heating to the solder temperature can already take place under vacuum conditions in common with the heat treatment in the case of the solder temperature, wherein the pressure can lie within the region of $\leq 10^{-3}$ mbar, preferably $\leq 10^{-4}$ mbar.

The heating up process to the solder temperature can be carried out continuously at constant or varying heating up rate, wherein the heating up rate can be selected within the range of 5° C. per minute to 30° C. per minute and especially within the range of 10° C. per minute to 20° C. per minute.

Alternatively or additionally, the component with the inserted molded repair part can also be held (aged) at one or more intermediate temperatures for a specific time during the heating up process in order to give the molded repair part sufficient time for example for the outgassing of binding agents. Therefore, intermediate ageings within the temperature range of 400° C. to 1100° C., for example at 450° C., 600° C. and/or 1050° C. for a time period of 5 to 40 minutes, especially 10 to 30 minutes, can be carried out.

A correspondingly produced component can for example be a turbine intermediate casing which constitutes the connecting passage between the high-pressure turbine and the low-pressure turbine of a turbomachine and is exposed to particularly high stresses.

BRIEF DESCRIPTION OF THE DRAWINGS

In the attached drawings, in a purely schematic manner.

DETAILED DESCRIPTION OF EMBODIMENTS OF THE INVENTION

Further advantages, characteristics and features of the present invention become clear in the following detailed description of exemplary embodiments. However, the invention is not limited to these exemplary embodiments.

Figure 1:
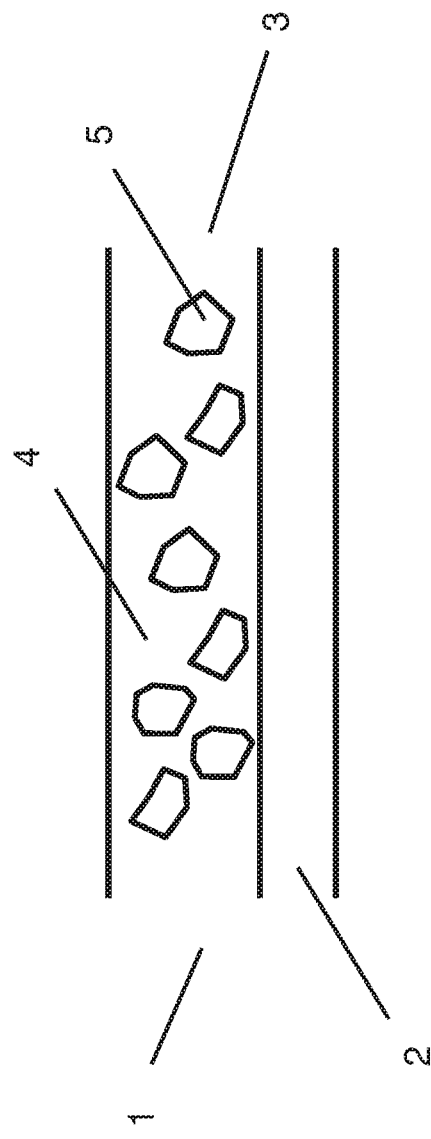
FIG. 1 shows a sectional view through a two-layer soldering tape, as used in the present invention.
Figure 2:
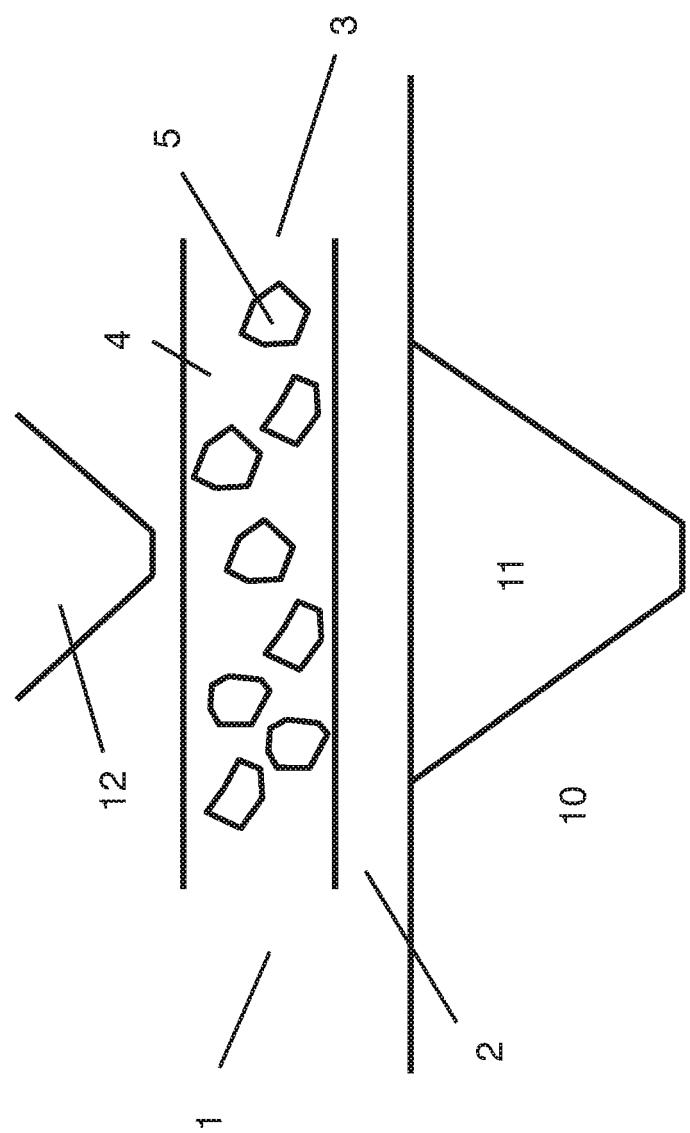
FIG. 2 shows a sectional view of a die-punch arrangement for producing a conical molded repair part according to the present invention.

FIG. 1 shows a so-called soldering tape 1 which is constructed from two layers, specifically one layer 2 of Ni-solder and one layer 3 of a mixture of Ni-solder 4 and hard material particles 5.

The layer 3 of nickel solder 4 and hard material particles 5 is composed in the depicted exemplary embodiment so that the layer 3 has about 60 wt. % Ni-solder 4 and 40 wt. % hard material particles in the form of a hard alloy on a base of cobalt.

The nickel solder, as used in the pure nickel-solder layer 2 and in the layer 3 with a mixture of nickel solder 4 and hard material particles 5, can be composed of 19 wt. % chromium, 10 wt. % silicon and remainder nickel and unavoidable impurities. In the case of the hard material alloy, it can be a cobalt-based alloy which can have 16.5-18.5 wt. % chromium, 27-30 wt. % molybdenum, 3-3.8 wt. % silicon, up to 3 wt. % nickel and iron, 0.080 wt. % carbon, 0.07 wt. % nitrogen, 0.05 wt. % oxygen, 0.03 wt. % phosphor and 0.03 wt. % sulfur and the remainder unavoidable impurities.

Figure 3:
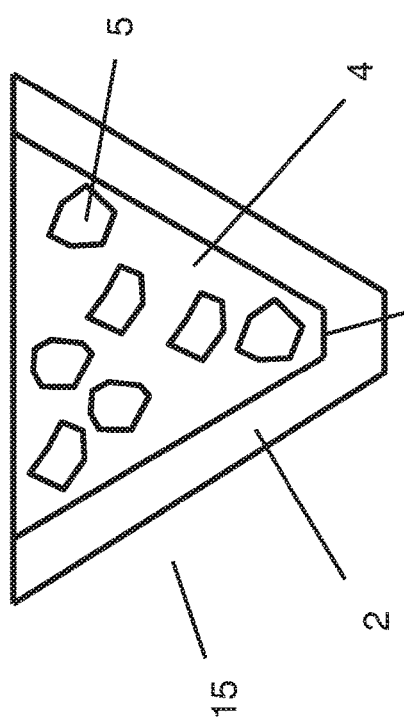
FIG. 3 shows a sectional view of a conical molded repair part according to the invention.

The soldering tape 1, which can be designed not only in tape form but also in plate form or in other suitable forms, can comprise the Ni-solder 4 and also the hard material particles 5 in powder form with a binding agent, such as a plastic, so that the soldering tape 1 or a corresponding soldering plate is deformable. Accordingly, a three-dimensionally formed molded repair part can be formed from the flat soldering tape 1, as is shown in FIG. 3 for example. To this end, provision can be made for a die 10 which has a corresponding negative mold 11 into which the soldering tape is pressed by means of a punch 12. By compressing the soldering tape 1 in the negative mold 11 by means of the punch 12 and by removing the surplus pieces of the soldering tape 1, a corresponding conical molded repair part 15 can be formed, as is shown in FIG. 3 for example. However, the molded repair part 15 can also be formed in another suitable mold. The soldering tape 1 is pressed into the negative mold 11 of the die 10 in this case so that the pure Ni-solder layer 2 butts against the die and is first of all impressed into the negative mold 11 by means of the punch 12. The result is therefore a conical molded repair part 15 in which an outer, pure Ni-solder layer 2 is located in the region of the cone surface, whereas the cone body is formed from a mixture layer 3 of Ni-solder 4 and hard material particles 5. The outer surface of the base of the conical molded repair part 15 is also formed by the mixture layer 3 of Ni-solder 4 and hard material particles 5.

The corresponding molded repair part 15 can now be inserted into an opening or recess of a component 22, wherein the inner wall 21 of the component 22, which encompasses the opening or recess, is formed complementarily to at least a part of the surface of the conical molded repair part 15, wherein the complementary shape of the opening or recess of the component 22 can be achieved by means of corresponding material machining both of the opening or recess of the component 22 and of the molded repair part. It is particularly advantageous to prepare the opening or recess of the component 22 by material removal for insertion of a correspondingly formed molded repair part 15 since as a result of this not only the shapes are mutually adapted but also undesirable oxide layers or other foreign substances, which could impair connecting of the molded repair part 15 to the base material of the component 22, are removed from the inner wall 21 of the opening or recess of the component 22.

Figure 4:
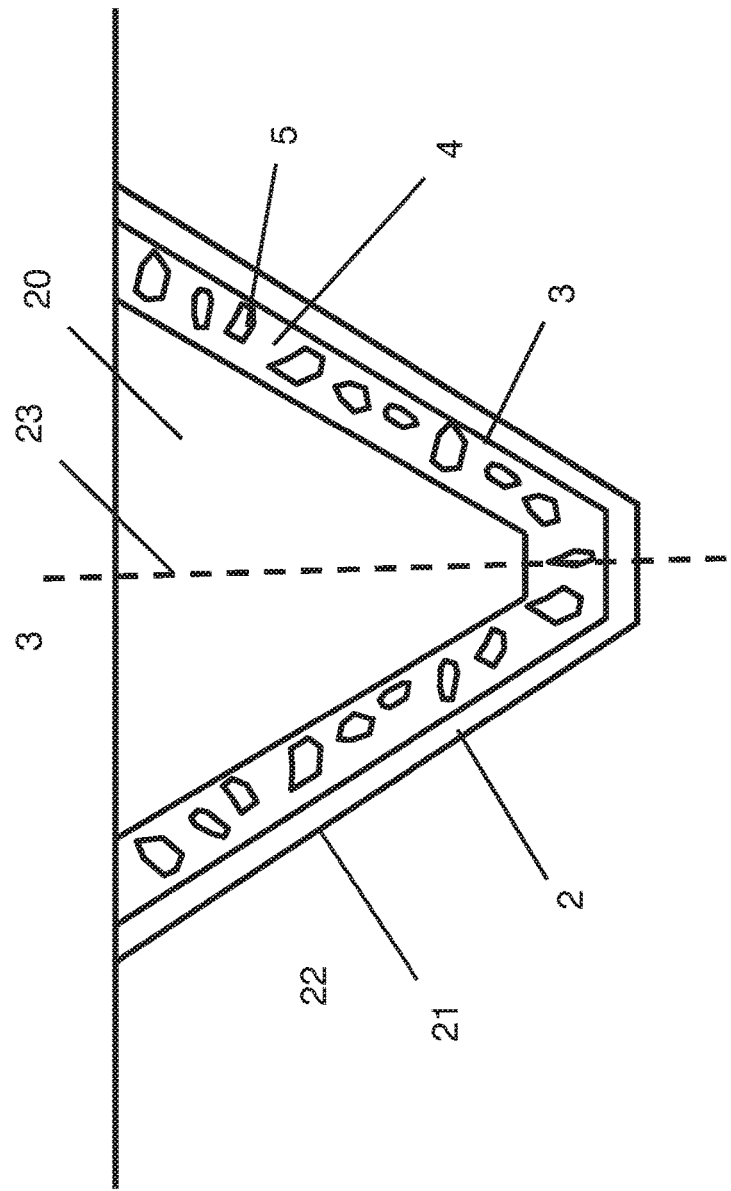
FIG. 4 shows a sectional view through a part of a component in which the molded repair part from FIG. 3 has been inserted.

FIG. 4 shows a recess 20 in a component 22 with a central axis 23, into which a corresponding molded repair part 15 has been inserted. As a result of a suitable heat treatment for melting the solder in the pure Ni-solder layer 2 and in the mixture layer 3, and also by removing a possibly existing binding agent in the molded repair part 15, the molded repair part is bonded as a solid coating to the base material of the component 22. The cavity of the recess 20 of the component 22 can be re-created in the desired shape by means of subsequent material machining of the mixture layer 3 by for example a corresponding hole being introduced in the mixture layer 3. Other types of material machining such as milling and the like are naturally also possible.

As a result, a wear-resistant coating with a high proportion of hard material particles 5 has been applied in an opening or recess 20 of a component 22 in a simple and reliable manner.

Although the present invention has been described in detail based on the exemplary embodiments, it is obvious to the person skilled in the art that the invention is not limited thereto but that rather modifications are possible in a way that individual features are omitted or other types of combinations of features are realized providing there is no departure from the scope of protection of the attached claims.

LIST OF REFERENCE NUMERALS

1 Soldering tape
2 Layer of Ni-solder
3 Mixture layer of Ni-solder and hard material particles
4 Ni-solder
5 Hard material particles
10 Die
11 Negative mold
12 Punch
15 Conical molded repair part
20 Recess
21 Inner wall of the recess before insertion of the molded repair part
22 Component
23 Central axis of the recess

What is claimed is:

1. A method for producing and/or repairing a borehole, opening or recess of a component of a turbomachine, wherein the borehole, recess or opening is subject to wear-stress and the method comprises:
    inserting into the borehole, opening or recess an at least two-layered molded part, a first layer of which is formed by a Ni-solder and a second layer of which is formed from a mixture of a Ni-solder and hard material particles of hard alloys based on cobalt or nickel and which at least partially has an outer shape which is complementary to an inner shape of the borehole, opening or recess, and
    at least partially heat-treating the component to solder the molded part onto the component;
and wherein producing of the molded part is carried out by deep drawing or pressing an at least two-layered tape or two-layered plate comprising the first layer and the second layer into a die in order to at least partially obtain an outer shape which is complementary to an inner shape of the borehole, opening or recess.

2. A method for producing and/or repairing a borehole, opening or recess of a component of a turbomachine, wherein the borehole, opening or recess is subject to wear-stress and the method comprises:
    inserting into the borehole, opening or recess an at least two-layered molded part, a first layer of which is formed by a Ni-solder and a second layer of which is formed from a mixture of a Ni-solder and hard material particles of hard alloys based on cobalt or nickel and which at least partially has an outer shape which is complementary to an inner shape of the borehole, opening or recess, and
    at least partially heat-treating the component to solder the molded part onto the component;
the second layer of the molded part comprising 35 to 45 wt. % of hard material particles.

3. The method of claim 1, wherein producing of the molded part is carried out such that the Ni-solder layer at least partially constitutes an outer edge of the molded part which comes into contact with an inner surface of the borehole, opening or recess when inserted into the borehole, opening or recess.

4. The method of claim 2, wherein producing of the molded part is carried out such that the Ni-solder layer at least partially constitutes an outer edge of the molded part which comes into contact with an inner surface of the borehole, opening or recess when inserted into the borehole, opening or recess.

5. The method of claim 1, wherein the first layer does not contain hard material particles.

6. The method of claim 2, wherein the first layer does not contain hard material particles.

7. The method of claim 1, wherein heat-treating the component comprises ageing at a temperature of from 1150° C. to 1200° C. for 10 to 25 minutes.

8. The method of claim 2, wherein heat-treating the component comprises ageing at a temperature of from 1150° C. to 1200° C. for 10 to 25 minutes.

9. The method of claim 1, wherein the hard alloy comprises a Co—Mo—Cr—Si-alloy.

10. The method of claim 2, wherein the hard alloy comprises a Co—Mo—Cr—Si-alloy.

11. The method of claim 1, wherein the Ni-solder is an alloy which comprises Cr and Si.

12. The method of claim 2, wherein the Ni-solder is an alloy which comprises Cr and Si.

* * * * *